UNITED STATES PATENT OFFICE.

AARON C. HORN, OF NEW YORK, N. Y.

WATERPROOFING COMPOUND.

1,031,003.  Specification of Letters Patent.  Patented July 2, 1912.

No Drawing. Application filed December 30, 1911. Serial No. 668,617.

*To all whom it may concern:*

Be it known that I, AARON C. HORN, a citizen of the United States, and a resident of New York, in the county of New York and State of New York, have invented certain new and useful Improvements in Waterproofing Compounds, of which the following is a specification.

This invention relates to a composition for waterproofing concrete and relates in particular to a composition belonging to the class of products known as "integral waterproofing compounds", all as more fully hereinafter described and claimed.

The waterproofing of concrete in the mass is carried out usually by what is known as the "integral waterproofing method", that is to say, admixed with cement is a body capable of filling the pores of the mass and preventing the passage of water there through. Of the compounds heretofore employed for the purpose, metallic soaps have proven the most satisfactory and among these in particular the soaps formed by combining lime with stearic acid. Soaps of this character, under certain conditions apparently become oxidized and change in character so that they become soluble, or at least lose their power of resisting the ingress of moisture. Waterproofing has also been effected by the incorporation of oils with the concrete, but such procedure has the disadvantage of considerably reducing the strength of the concrete mass. Also, the coating of the surface of the concrete with some waterproofing material is frequently resorted to, but for underground operations, these coatings are ordinarily not very satisfactory as customarily applied.

The present invention has for its object the production of a waterproofing compound, preferably in a finely divided or pulverulent form, which may be readily mixed with dry, unset cement, and incorporated with aggregate and water.

It is the object of the invention also to provide a composition which will permit of the admixture of water with the concrete mass without the material separation of the waterproofing medium. The lime soaps have the disadvantage that they float on the surface of the water and do not mix very readily with the cement and aggregate when same is being worked up into the form of concrete mortar.

It is further the object of the invention to produce a waterproofing body which is permanent in its action and is not readily hydrolyzed even under severe service conditions.

For this purpose I make use of the insoluble soaps formed by combining the fatty acid of a drying oil with lime, zinc or equivalent base. The drying oils which I prefer to use to secure fatty acids for this purpose, are linseed, fish, chinese wood oil, or tung oil, soya bean oil and the like, although other oils, having less highly developed siccative properties, such as cotton seed oil and corn oil, may be used in conjunction with highly siccative oils. Preferably however, I make use of the fatty acids derived from tung oil and in particular those derived from polymerized oil. When tung oil is heated to 250° or 300° C. polymerization takes place accompanied by gelatinization. The resulting product is a stiff, jelly-like mass, which is capable of being saponified, yielding on subsequent acidification the fatty acids of the polymerized product. These may then be combined with lime or other base to form a stable soap of the character described.

The production of the fatty acid may be effected in various ways, such as by autoclave saponification under pressure with a mineral acid catalyzer in the manner well known in the art, or in any other suitable manner. Saponification by alkali may be carried out in a suitable way merely by boiling the oil with a solution of caustic soda containing from 20% to 25% of caustic, based on the amount of oil employed. The solution so obtained may then be treated with milk of lime, whereupon the lime soap is precipitated and may then be washed and dried. By using alum as a precipitating agent the aluminum soap is obtained. Using other salts, such as zinc sulfate, barium chlorid, copper sulfate, lead acetate, iron chlorid and the like, various other soaps may be secured. By mixing two or more salt solutions which are compatible a mixed soap is secured. One of these which is very useful for the present purpose is the combined soap of lime and barium, for the latter component, because of its great weight, renders the composition more readily incorporated with the cement mass. The combined soap of lime and magnesia, or barium and magnesia may likewise be secured. Another method of preparing the compound is to separate the fatty acid from the saponified material by the addition of an acid such as sulfuric acid. The free fatty acids are dried and incorporated with quick lime barium hydrate or other reactive basic bodies, the mass being heated in order to bring about the reaction in an expeditious manner. Ordinarily, I prefer to make use of a considerable excess of the basic material, for example, to one part of the fatty acid, I may add two or three parts or more of hydrated lime and heat the mixture to a point where the fatty acid combines with the lime, forming, apparently, a basic soap, which I find gives better results ordinarily than when the lime and fatty acids are combined merely in their equivalent proportions. In the same way, soaps containing an excess of other bases, such as magnesia, zinc oxid, barium oxid or hydrate may be secured.

The operation of mixing the material is best made continuous, that is to say, the fatty acid and the lime, or other base are combined in a continuous, or non-cumulative manner. This may be carried out with any simple apparatus in the manner well known in the art. The product may be ground and bolted, or subjected to air separation, the latter method being the most satisfactory because of the extreme fineness to which the product is reduced. It is important to have the particles of the waterproofing compound of the utmost degree of fineness for efficient and economical results. The product obtained in this manner, or in any other suitable way is usually incorporated with the cement to the extent of 1% or 2%, based on the amount of neat cement employed. Admixture of sand aggregate and water is then made, when the concrete is ready for use. When the set concrete has dried, it possesses a remarkable resistance to the ingress of moisture, the water running off the surface of the mass as if the material had been heavily oiled.

In preparing my composition with polymerized oil as one of the ingredients, I preferably work by the wet process of precipitation, as this seems to give slightly better results than by the method of heat treatment and incorporation. In this case also I preferably use an excess of base in order to produce a basic soap.

A suitable composition is made by taking a quantity of tung oil, say 50 lbs., heating it in a kettle gradually up to the gelatinizing point. When the mass commences to thicken rapidly, but before it has formed a stiff jelly, the kettle should be drawn from the fire and the contents removed and cooled as quickly as possible. The stiff jelly which results is boiled with 12 lbs. of caustic soda and the requisite amount of water until saponified. A solution carying 125 lbs. of slaked lime as a milk or cream of lime, together with 25 lbs. of barium hydrate or chlorid is run into the saponified solution and thoroughly mixed. The precipitate which is basic composite soluble soap is removed, washed slightly and dried. This product is then ground to the requisite degree of fineness, when it is ready for use. In operating in this manner, care should be taken so as to secure a fairly complete precipitation of the barium, as otherwise this body, being more soluble, is likely to be washed out of the product and lost. In making up a product with the raw tung oil, I may proceed as above by saponifying the raw oil and precipitate with an excess of lime, zinc oxid or other base, so as to form a composite soap; or I may heat the raw oil with a great excess of the base, taking care to render the heating uniform so that the oil does not become burned. Or the fatty acids which are obtained by saponification and subsequent acidification may be heated with an excess of barium hydrate or zinc oxid to form an insoluble soap. Various dye stuffs and coloring matter may be used in this material, especially those formed to a certain extent by co-precipitation so as to produce coloring matters which at the same time have a waterproofing action on the concrete as described in U. S. Letters Patent 932,280, granted to me on August 24, 1909.

In conjunction with the fatty acids above mentioned I may make use of the fatty acids of non-drying oils such as stearic, oleic and palmitic acid. The combination of these acids with the acids of drying oils is particularly useful for certain applications. A composition obtained by the treatment of equal parts of tung oil fatty acid and stearic acid with an excess of lime and (or) baryta appears to be nearly as resistant to hydrolysis as the tung oil compound alone and in addition is somewhat more easily ground. The mixed oleate and tungate of lime and barium may likewise be used.

In the foregoing formulas I have mentioned illustratively several bodies of equivalent character which may be used in making up the various forms of waterproofing materials under the present invention, but it is to be noted that I do not limit myself to the exact formulas or combinations mentioned, but may use other materials giving like results and may hence evoke the doctrine of equivalency in so far as same may be thus applicable.

To recapitulate, my invention consists in a composition for waterproofing concrete and similar materials, which comprises a water insoluble soap substantially resistant to hydrolytic action, prepared from the fatty acid of a drying oil, in particular tung oil in combination with a base such as lime magnesia, zinc barium, aluminum and the like and more particularly these bases in admixture so that a composite water insoluble soap is secured, preferably using the base in excess so that the soap is essentially of a basic character; and further comprises the use of polymerized tung oil in the production of such basic waterproofing compounds.

What I claim is—

1. A concrete waterproofing compound, comprising a water insoluble basic soap of a highly siccative oil in a pulverulent form.

2. A concrete waterproofing compound, comprising a water insoluble soap of tung oil in a pulverulent form.

3. A concrete waterproofing compound comprising lime soap of tung oil in a pulverulent form.

4. A waterproofing compound comprising a basic lime soap of tung oil fatty acid in a pulverulent form.

5. A concrete waterproofing compound, comprising a composite water insoluble highly divided soap of tung oil fatty acid in a pulverulent form.

6. A concrete waterproofing compound comprising the lime soap of polymerized tung oil fatty acid in a pulverulent form.

7. A concrete waterproofing compound comprising the lime and barium soap of polymerized tung oil fatty acid all in a pulverulent form.

8. A concrete waterproofing compound comprising the lime and barium soap of polymerized tung oil fatty acid and a water insoluble stearate all in a pulverulent form.

9. A concrete waterproofing composition consisting of a water insoluble basic soap in a finely divided condition, comprising the lime and barium soaps of polymerized tung oil fatty acid and a water insoluble basic soap of the fatty acid of a non-drying oil.

10. A concrete waterproofing composition consisting of a water insoluble basic soap in a finely divided condition, comprising the lime and barium soaps of heat-polymerized tung oil fatty acid and a water insoluble basic soap of the fatty acid of a non-drying oil.

Signed at New York in the county of New York and State of New York this 28th day of Dec. A. D. 1911.

AARON C. HORN.

Witnesses:
 WM. J. HOLMES,
 CHAS. J. KELLY.